(12) United States Patent
Carlos

(10) Patent No.: US 10,229,518 B2
(45) Date of Patent: Mar. 12, 2019

(54) DRAG TO UNDO/REDO A DIGITAL INK CANVAS USING A VISIBLE HISTORY PALETTE

(71) Applicant: Prysm, Inc., San Jose, CA (US)

(72) Inventor: Dino Cris Carlos, Fishers, IN (US)

(73) Assignee: Prysm, INC., San Jose, CA (US)

(*) Notice: Subject to any disclaimer, the term of this patent is extended or adjusted under 35 U.S.C. 154(b) by 0 days.

(21) Appl. No.: 15/483,673

(22) Filed: Apr. 10, 2017

(65) Prior Publication Data

US 2018/0293766 A1 Oct. 11, 2018

(51) Int. Cl.
*G06T 11/20* (2006.01)
*G06F 3/0481* (2013.01)
*G06F 17/24* (2006.01)
*G06F 3/0484* (2013.01)

(52) U.S. Cl.
CPC ........ *G06T 11/203* (2013.01); *G06F 3/04817* (2013.01); *G06F 3/04845* (2013.01); *G06F 17/242* (2013.01)

(58) Field of Classification Search
CPC .............. G06T 11/203; G06F 3/04817; G06F 3/04845; G06F 17/242
USPC ........................................ 345/418, 441, 619
See application file for complete search history.

(56) References Cited

U.S. PATENT DOCUMENTS

| 2006/0250418 | A1* | 11/2006 | Chartier | G05B 19/41805 345/619 |
| 2013/0024418 | A1* | 1/2013 | Sitrick | G06Q 10/101 707/608 |
| 2014/0289645 | A1* | 9/2014 | Megiddo | G06F 3/048 715/753 |
| 2015/0186021 | A1* | 7/2015 | Hamburg | G06F 21/6218 715/753 |
| 2016/0357720 | A1* | 12/2016 | Thimbleby | G06F 3/1454 |

OTHER PUBLICATIONS

Nakamura, T., & Igarashi, T. (Oct. 2008), "An Application-Independent System for Visualizing User Operation History", In Proceedings of the 21st annual ACM symposium on User interface software and technology (pp. 23-32). ACM.*

(Continued)

*Primary Examiner* — Sarah Lhymn
(74) *Attorney, Agent, or Firm* — Wolfe-SBMC

(57) ABSTRACT

Techniques are described to support undo and redo operations in connection with a digital ink canvas on an appliance that can take part in a collaboration amongst multiple appliances that can share content. The digital ink canvas is a digital area that accepts inputs from a user and renders a digital stroke. The described techniques make use of a navigable history palette which includes individual history entries that each provide a visual representation of a state of the digital ink canvas at some point during the collaboration. The history palette provides a navigable user interface instrumentality which permits panning through the history palette to enable user to select a particular visual representation. The digital ink canvas is then returned to the state associated with the selected visual representation. The selected visual representation can be provided across the appliances participating in the virtual collaboration.

20 Claims, 10 Drawing Sheets

(56) References Cited

OTHER PUBLICATIONS

Hailpern, J., Hinterbichler, E., Leppert, C., Cook, D., & Bailey, B. P. (Jun. 2007), "Team Storm: Demonstrating an Interaction Model for Working With Multiple Ideas During Creative Group Work", In Proceedings of the 6th ACM SIGCHI Conference on Creativity & Cognition (pp. 193-202). ACM.*

* cited by examiner

DRAG TO UNDO/REDO A DIGITAL INK CANVAS USING A VISIBLE HISTORY PALETTE

BACKGROUND

Shared workspaces may be implemented via a network to support a virtual environment in which users are able to share assets such as applications, content, video conferencing, annotations, and other media across a plurality of appliances. Shared workspaces thus enable users distributed over a variety of geographic locations to collaborate in real time to share thoughts and ideas.

Conventional techniques used to implement the shared workspace provide single and static assets for sharing. Different appliances that participate in the shared workspace, however, may have different characteristics in how the assets are consumed. The appliances, for instance, may have different resolutions, network connections having different amounts of bandwidth, and so forth.

In a shared workspace, one problem with existing user interfaces pertains to undo and redo operations with respect to navigating through content. For example, to undo the current content of the shared workspace to return to a previous state, a user may have to tap or otherwise select an "undo" user interface button to return to the previous state. Each time the user wishes to move forwards or backwards through content state, the user must tap or otherwise select the appropriate button for each state through which the user wishes to navigate. For example, to undo an associated ink canvas five times, the user would have to select the appropriate button five times. This can be time-consuming and inconvenient for the user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
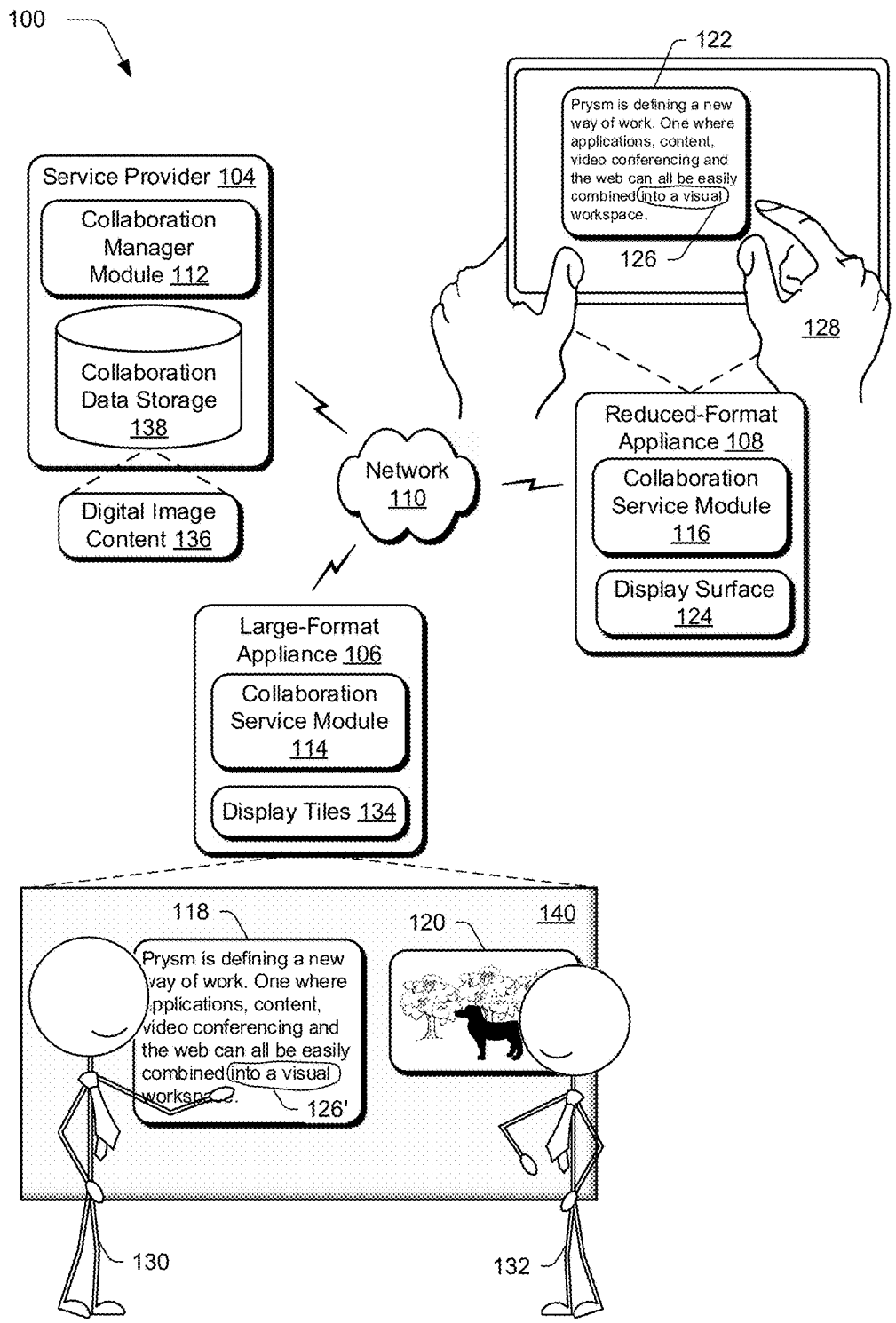
FIG. 1 is an illustration of a collaboration system operable to employ techniques described herein.

In the discussion below, innovative techniques are described to implement undo and redo operations in conjunction with a so-called "virtual collaboration" between multiple different appliances, each of which uses a digital ink canvas for presenting content. It is to be appreciated and understood, however, that the innovative undo and redo techniques can be utilized in any suitable streaming environment and, not necessarily, a virtual collaboration between multiple different appliances.

Shared workspaces enable virtual collaboration of remote and locally connected appliances having a variety of different hardware characteristics, such as tablet computers, wall displays, computing devices, mobile phones, and so forth. These appliances may also include a variety of software having differing characteristics usable to render assets as part of the shared workspace, such as particular word processors, presentation software, drawing applications, and so forth. Examples of assets include documents, images, video conferencing, and so forth as further described in the following.

Virtual collaborations that utilize shared workspaces typically use a network connection to place the remote and locally connected appliances into communication with one another. The network connection can, in many instances, utilize an Internet connection. So, for example, multiple appliances located in one location may participate in a collaboration with multiple appliances located in a separate, remote location. Each location can maintain a network connection to the Internet.

Techniques are described to support undo and redo operations in connection with a digital ink canvas. The digital ink canvas is a digital area that accepts inputs from a user such as touch, mouse, stylus, and the like, and renders a digital stroke. A digital stroke can have various properties such as various colors, thicknesses, and opacity. The described techniques make use of a history palette which includes individual history entries. Each history entry provides a visual representation of a state of the digital ink canvas at some point during the collaboration. In some instances, the visual representation appears as a thumbnail representation. The thumbnail representation constitutes a visual depiction of content that has been provided onto the digital ink canvas. To this extent, the thumbnail representation is akin to a visual "snapshot" of the digital ink canvas that is reduced in size, e.g., scaled, and represented, along with other thumbnail representations, in the history palette. The content provided onto the digital ink canvas can include, by way of example and not limitation, not only digital strokes, but other content such as applications, files, documents, and the like.

When a user interacts with the digital ink canvas, content of the interaction is saved, for example, in a database, and the interaction is applied to the digital ink canvas. The digital ink canvas is then rasterized to provide a rasterized image which serves as a basis for each visual representation that appears in the history palette.

The history palette provides a navigable user interface instrumentality which can be used by the user to cause content displayed on the digital ink canvas to change to correspond to the content represented by a selected visual representation. That is, each visual representation represents a state of the digital ink canvas, or a portion of the digital ink canvas, which, in at least some embodiments, permits panning, e.g., as by swiping or otherwise advancing forward and backward, through the history palette to enable user to select a particular visual representation. Alternately or additionally, the user may simply touch select a particular history entry or in another implementation may call out a label associated with a particular history entry. Once the particular visual representation is selected, the digital ink canvas is then returned to the state associated with the selected visual representation. The selected visual representation can then be provided across the appliances participating in the virtual collaboration. This allows users to quickly and efficiently return to a particular state of the collaboration without having to repetitively engage, e.g., click, an undo or a redo button.

In some instances, a virtual collaboration can employ one or more large-format appliances and one or more reduced-format appliances. A large-format appliance is typically configured to be mounted to a wall, for instance, and may be feature rich and configured to support a high resolution, network bandwidth, and hardware resources such as memory and processing. This large-format appliance may also include an application configured to consume particular asset formats, such as to support word processing, drawing (e.g., CAD), and so forth. A reduced-format appliance, such as a tablet or mobile phone configured to be held by one or more hands of a user, however, may have reduced resolution, network bandwidth, and hardware resources when compared to the large-format appliance.

In some instances, a large-format appliance may upload, e.g., stream an asset to a service provider for sharing that is configured for consumption via a corresponding application, e.g., a particular word processor. In addition, the reduced-format appliances may also upload or stream assets to the service provider for sharing with other appliances participating in the collaboration. The techniques described herein enable a history palette, such as that described above and below, to be employed during the course of the collaboration, thus enhancing the users' experience by enabling users to quickly return to a previous state of the collaboration by way of a digital ink canvas on which content is rendered. So, for example, if one user wishes to discuss a point previously presented, the user can simply navigate through the history palette to find a particular history entry that they wish to discuss. By selecting the history entry, the digital ink canvas can be returned to the state associated with the selected history entry to begin the discussion. Once the discussion has concluded, the user can then navigate back through the history palette to return the digital ink canvas to its former current state.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a collaboration system 100 in an example implementation that is configured to implement one or more aspects of the techniques described herein. As shown, collaboration system 100 includes, without limitation, a service provider 104 and appliances that are used to implement a shared workspace, illustrated examples of which include a large-format appliance 106 and a reduced-format appliance 108, each of which are communicatively coupled via a network 110. Although large and reduced format appliances 106, 108 are described in relation to the following examples, it should be readily apparent that a plurality of appliances may be made up of appliances that support large or reduced formats, solely.

The service provider 104 is illustrated as including a collaboration manager module 112 and the appliances are illustrated as including respective collaboration service modules 114, 116 that together are representative of functionality implemented at least partially in hardware to support a shared workspace of a collaborative environment as further described in the following. Collaboration service modules 114, 116, for instance, may be configured as software such as applications, third-party plug-in modules, webpages, web applications, web platforms, and so on that support participation as part of a shared workspace. The collaboration manager module 112 is representative of functionality (e.g., implemented via software) that is usable to manage this interaction, examples of which are further described in relation to FIGS. 2-4. Although illustrated separately, functionality of the collaboration manager module 112 to manage the shared workspace may also be incorporated by the appliances themselves.

The collaboration service modules 114, 116, for instance, may be implemented as part of a web platform that works in connection with network content, e.g. public content available via the "web," to implement a shared workspace. A web platform can include and make use of many different types of technologies such as, by way of example and not limitation, URLs, HTTP, REST, HTML, CSS, JavaScript, DOM, and the like. The web platform can also work with a variety of data formats such as XML, JSON, and the like. The web platform can include various web browsers, web applications (i.e. "web apps"), and the like. When executed, the web platform allows a respective appliance to retrieve assets (e.g., web content) such as electronic documents in the form of webpages (or other forms of electronic documents, such as a document file, XML file, PDF file, XLS file, etc.) from a Web server (e.g., the service provider) for display on a display device in conjunction with the shared workspace.

The shared workspace is configured to share assets and user interactions with those assets. In the context of this disclosure, an "asset" may refer to any interactive renderable content that can be displayed on a display, such as on a display device of the large-format appliance 106 or reduced-format appliance 108, among others. Interactive renderable content is generally derived from one or more persistent or non-persistent content streams that include sequential frames of video data, corresponding audio data, metadata, flowable/reflowable unstructured content, and potentially other types of data, including the history palette described above and below.

Generally, an asset may be displayed within a dynamically adjustable presentation window. An example of this is illustrated presentation windows 118, 120 for the large-format appliance 106 and presentation window 122 as displayed for the reduced-format appliance 108. For simplicity, an asset and corresponding dynamically adjustable presentation window are generally referred to herein as a single entity, i.e., an "asset." Assets may comprise content sources that are file-based, web-based, or Live Source. Assets may include images, videos, web browsers, documents, renderings of laptop screens, presentation slides, any other graphical user interface (GUI) of a software application, such as a navigable user interface like the illustrated and described history palette, and the like.

An asset generally includes at least one display output generated by a software application, such as a GUI of the software application. In one example, the display output is a portion of a content stream. In addition, an asset is generally configured to receive one or more software application inputs. The reduced-format appliance 108, for instance, may include a display device 124 having gesture detection functionality (e.g., a touch sensitive display device, a display device associated with one or more cameras configured to capture a natural user input, and so forth) to capture a gesture, such as an annotation 126 to circle text in a document made by one or more fingers of a user's hand 128. Other gestures can include interactions with the history palette described below, to enable a user to select a history entry, and have that history shared out amongst a collaboration's participants, as described in more detail below.

With respect to the annotation, the annotation is then communicated and displayed on the large-format appliance 106 as annotation 126' that also circles corresponding text in a presentation window 118 that is viewable by users 130, 132 of that appliance. Thus, unlike a fixed image, an asset is a dynamic element that enables interaction with the software application associated with the asset, for example, for manipulation of the asset. For example, an asset may include select buttons, pull-down menus, control sliders, and so forth that are associated with the software application and can provide inputs to the software application.

As also referred to herein, a "shared workspace" is a virtual "digital canvas" or "digital ink canvas" on which assets associated therewith, and their corresponding content streams, are displayed within a suitable dynamic "viewport window". Thus, a shared workspace may comprise one or more associated assets (each asset displayed within a presentation window), whereby the entire shared workspace is displayed within a dynamically adjustable viewport window. A shared workspace may be displayed in the entire potential render area/space of a display device of the large-format appliance 106 and/or the reduced-format appliance 108, so that only a single shared workspace can be displayed on the surface thereof. In this case, the area of the viewport window that displays the shared workspace comprises the entire render area of the large-format appliance 106 and/or the reduced-format appliance 108. In other implementations, however, the shared workspace and the viewport window may be displayed in a sub-area of the total display area of the large-format appliance 106 and/or the reduced-format appliance 108 that does not comprise the entire render area of respective display devices of these appliances. For example, multiple shared workspaces may be displayed in multiple viewport windows on the large-format appliance 106 and/or the reduced-format appliance 108 concurrently, whereby each shared workspace and viewport window does not correspond to the entire display surface. Each asset associated with a shared workspace, and content stream(s) corresponding to the asset, are displayed in a presentation window according to defined dimensions (height and width) and a location within the shared workspace and viewport window. The asset and presentation window dimensions and location may also be user-adjustable. As also referred to herein, a "project" may comprise a set of one or more related shared workspaces.

The large-format appliance 106 in this example is formed using a plurality of display tiles 134, e.g., arranged to form a display wall. The service provider 104 includes digital image content 136, which is illustrated as stored in collaboration data storage 136, e.g., using one or more memory devices as further described in relation to FIG. 11. The service provider 104 may receive this digital image content 136 from a variety of sources, such as the reduced-format appliance 108, the large-format appliance 106, remotely via a third-party source via the network 110 (e.g., a website), or from an information network or other data routing device, and converts the input into image data signals. Thus, digital image content 136 may be generated locally, with the large-format appliance 106 or the reduced-format appliance 108, or from some other location. For example, when the collaboration system 100 is used for remote conferencing, digital image content 136, such as the history palette described below, may be received via any technically feasible communications or information network, wired or wireless, that allows data exchange, such as a wide area network (WAN), a local area network (LAN), a wireless (Wi-Fi) network, and/or the Internet, among others as represented by network 110. The service provider 104, reduced-format appliance 108, and large-format appliance 106 may be implemented as one of more computing devices, such as part of dedicated computers, as one or more servers of a server farm (e.g., for the service provider 104 as implementing one or more web services), dedicated integrated circuit, and so on. These computing devices are configured to maintain instructions in computer-readable media and that are executable by a processing system to perform one or more operations as further described in relation to FIG. 11.

Display devices of the large-format appliance 106 and/or the reduced-format appliance 108 may include the display surface or surfaces of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand-alone display, head mounted display or as a single or multi-screen tiled array of displays. Display sizes may range from smaller handheld or head mounted display devices to full wall displays. In the example illustrated in FIG. 1, the large-format appliance 106 includes a plurality of display light engine and screen tiles mounted in an array, which are represented by the display tiles 134.

In operation, the large-format appliance 106 displays image data signals received from the service provider 104. For a tiled display, image data signals 102 are appropriately distributed among display tiles 134 such that a coherent image is displayed on a display surface 138 of the large-format appliance 106. Display surface 140 typically includes the combined display surfaces of display tiles 134. In addition, the display surface 138 of large-format appliance 106 is touch-sensitive that extends across part or all surface area of display tiles 134. In one implementation, the display surface 140 senses touch by detecting interference between a user and one or more beams of light, including, e.g., infrared laser beams. In other implementations, display surface 140 may rely on capacitive touch techniques, including surface capacitance, projected capacitance, or mutual capacitance, as well as optical techniques (e.g., sensor in a pixel), acoustic wave-based touch detection, resistive touch approaches, and so forth, without limitation and thus may detect "touch" inputs that do not involve actual physical contact, e.g., as part of a natural user interface. Touch sensitivity of the display surface 138 enables users to interact with assets displayed on the wall implementing touch gestures including tapping, dragging, swiping, and pinching. These touch gestures may replace or supplement the use of typical peripheral I/O devices, although the display surface 140 may receive inputs from such devices, as well. In this regard, the large-format appliance 106 may also include typical peripheral I/O devices (not shown), such as an external keyboard or mouse.

The display surface 140 may be a "multi-touch" surface, which can recognize more than one point of contact on the large-format appliance 106, enabling the recognition of complex gestures, such as two or three-finger swipes, pinch gestures, and rotation gestures as well as multiuser two, four, six etc. hands touch or gestures. Thus, a plurality of users 130, 132 may interact with assets on the display surface 140 implementing touch gestures such as dragging to reposition assets on the screen, tapping assets to display menu options, swiping to page through assets, or implementing pinch gestures to resize assets. Multiple users 130, 132 may also interact with assets on the screen simultaneously. Again, examples of assets include application environments, images, videos, web browsers, documents, mirroring or renderings of laptop screens, presentation slides, content streams, and so forth. Touch signals are sent from the display surface 140 to the service provider 104 for processing and interpretation. It will be appreciated that the system shown herein is illustrative only and that variations and modifications are possible.

Figure 2:
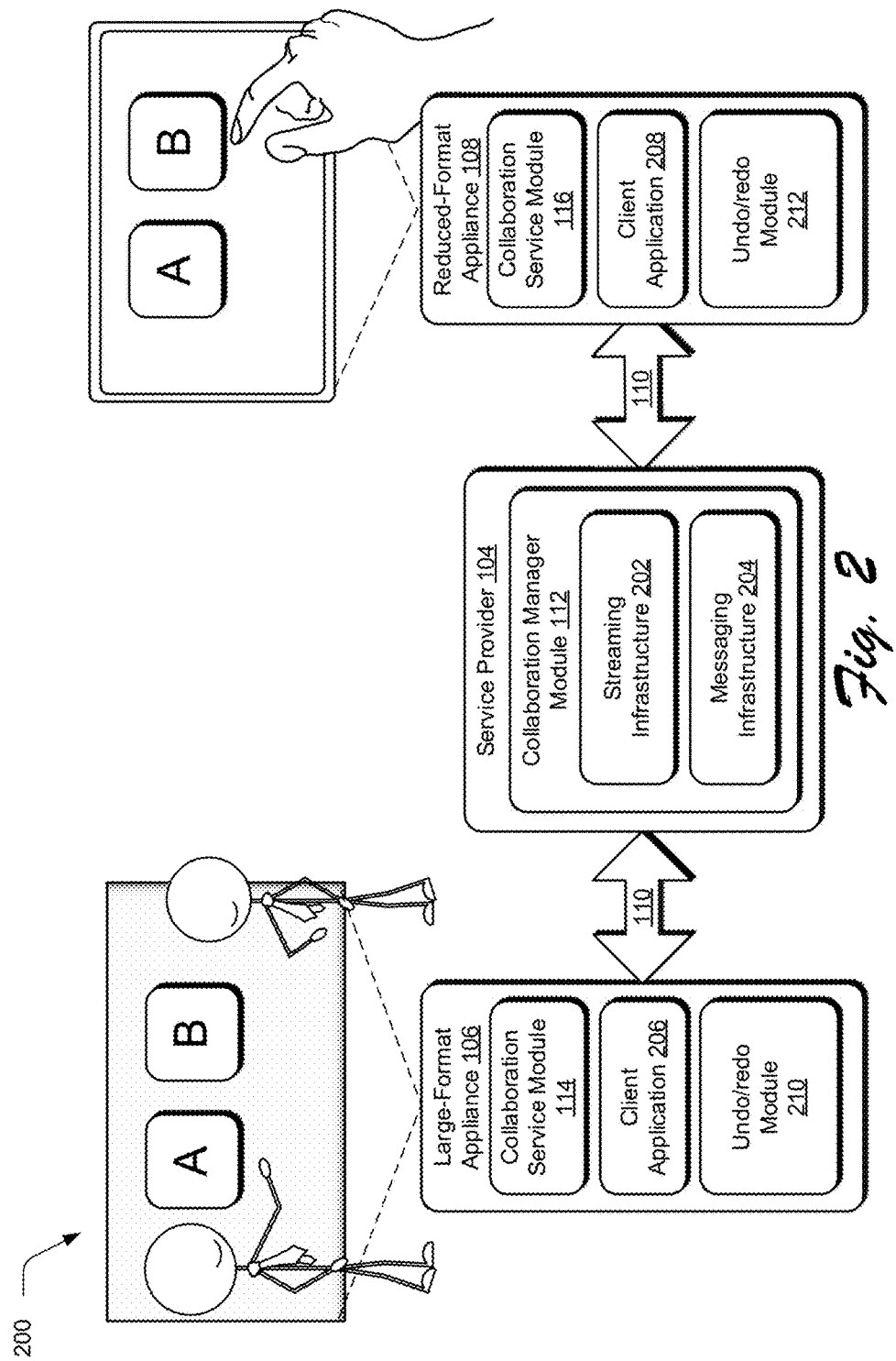
FIG. 2 is a conceptual diagram of a communication infrastructure of the collaboration system of FIG. 1 as sharing content streams across appliances.

FIG. 2 is a conceptual diagram of a communication infrastructure 200 of the collaboration system 100 of FIG. 1 as sharing content streams across appliances, e.g., across the large and reduced format appliances 106, 108 through interaction with the service provider 104. As shown, this communication infrastructure 200 includes, without limitation, the large-format appliance 106 and the reduced-format appliance 108 communicatively coupled to service provider 104 via a network 110. As shown in FIG. 2, communication infrastructure 200 of this example implementation includes streaming infrastructure 202 and messaging infrastructure 204 included as part of the collaboration manager module 112 to support communication of the collaboration service modules 114, 116 to implement the shared workspace. In this example, large-format appliance 106 includes a collaboration service module 114, one or more client applications 206 and a undo/redo module 210. Reduced-format appliance 108 includes a collaboration service module 116, one or more client applications 208 and a undo/redo 212.

Large-format appliance 106 is illustrated as sharing a content stream A, via communication infrastructure 200, with the reduced-format appliance 108. In response, reduced-format appliance 108 is configured to retrieve content stream A from communication infrastructure 200 and to display that content stream on a display device of the reduced-format appliance 108 with its content stream B. Likewise, reduced-format appliance 108 is configured to share content stream B, via communication infrastructure 200, with the large-format appliance 106. In response, the large-format appliance 106 is configured to retrieve content stream B from communication infrastructure 200 and to display that content stream on a display device of the large-format appliance 106 with its content stream A. Content of the content streams can include content associated with a history palette so as to enable users of each appliance to interact with the history palette, make history entry selections, and have those selections communicated to other applications in the collaboration. Doing so enables the digital ink canvasses associated with each application to be synchronized with one another, as described below in more detail.

In this fashion, the large and reduced format appliances 106, 108 are configured to coordinate with one another via the service provider 104 to generate a shared workspace that includes content streams A and B. Content streams A and B may be used to generate different assets rendered within the shared workspace. In one embodiment, each of the large and reduced format appliances 106, 108 perform a similar process to reconstruct the shared workspace, thereby generating a local version of that shared workspace that is similar to other local versions of the shared workspace reconstructed at other appliances. As a general matter, the functionality of the large and reduced format appliances 106, 108 are coordinated by respective collaboration service modules 114, 116 and client applications 206, 208, respectively.

Client applications 206, 208 are software programs that generally reside within a memory (as further described in relation to FIG. 11) associated with the respective appliances. Client applications 206, 208 may be executed by a processing system included within the respective appliances. When executed, client applications 206, 208 setup and manage the shared workspace discussed above in conjunction with FIG. 2, which, again, includes content streams A and B. In one implementation, the shared workspace is defined by metadata that is accessible by both the large and reduced format appliances 106, 108. Each of the large and reduced format appliances 106, 108 may generate a local version of the shared workspace that is substantially synchronized with the other local version, based on that metadata (discussed below in relation to FIG. 3).

In doing so, client application 206 is configured to transmit content stream A to streaming infrastructure 200 for subsequent streaming to the reduced-format appliance 108. Client application 206 also transmits a message to the reduced-format appliance 108, via messaging infrastructure 204, that indicates to the large-format appliance 106 that content stream A is available and can be accessed at a location reflected in the message. In like fashion, client application 208 is configured to transmit content stream B to streaming infrastructure 202 for subsequent streaming to the large-format appliance 106. Client application 208 also transmits a message to the large-format appliance 106, via messaging infrastructure 204, that indicates to the large-format appliance 106 that content stream B is available and can be accessed at a location reflected in the message. The message indicates that access may occur from a location within streaming infrastructure 202.

Client application 206 may also broadcast a message via messaging infrastructure 204 to the reduced-format appliance 108 that specifies various attributes associated with content stream A that may be used to display content stream A. The attributes may include a location/position, a picture size, an aspect ratio, or a resolution with which to display content stream A on the reduced-format appliance 108, among others, and may be included within metadata described below in relation to FIG. 3. Client application 208 may extract the attributes from messaging infrastructure 204, and then display content stream A at a particular position on a display device of the reduced-format appliance 108, with a specific picture size, aspect ratio, and resolution, as provided by messaging infrastructure 204. Through this technique, the large-format appliance 106 is capable of sharing content stream A with the reduced-format appliance 108. The reduced-format appliance 108 is also configured to perform a complimentary technique in order to share content stream B with the large-format appliance 106.

Client applications 206, 208 are thus configured to perform similar techniques in order to share content streams A and B, respectively with one another. When client application 206 renders content stream A on a display device of the large-format appliance 106 and, also, streams content stream B from streaming infrastructure 202, the large-format appliance 106 thus constructs a version of a shared workspace that includes content stream A and B. Similarly, when client application 208 renders content stream B on a display device of the reduced-format appliance 108 and, also streams content stream A from streaming infrastructure 202, the large-format appliance 106 similarly constructs a version of that shared workspace that includes content streams A and B.

The undo/redo modules 210, 212 may be part of the client applications or may be a separate component. The undo/redo modules are configured to support undo and redo operations in connection with a digital ink canvas, as described above and below. The digital ink canvas is a digital area that accepts inputs from a user such as touch, mouse, stylus, and the like, and renders a digital stroke. A digital stroke be thought of as a collection of points and can have various colors, thicknesses, and opacity. The undo/redo modules 210, 212 make use of a history palette which includes individual history entries. Each history entry provides a visual representation of a state of the digital ink canvas at some point during the collaboration. In some instances, the visual representation appears as a thumbnail representation. The thumbnail representation constitutes a visual depiction of content that has been provided onto the digital ink canvas. To this extent, the thumbnail representation is akin to a visual "snapshot" of the digital ink canvas that is reduced in size, e.g., scaled, and represented, along with other thumbnail representations, in the history palette. The content provided onto the digital ink canvas can include, by way of example and not limitation, not only digital strokes, but other content such as applications, files, documents, and the like.

When a user interacts with the digital ink canvas, content of the interaction is saved, for example, in a database, and the interaction is applied to the digital ink canvas. The digital ink canvas is then rasterized to provide a rasterized image which serves as a basis for each visual representation that appears in the history palette.

The history palette provides a navigable user interface instrumentality which can be used by the user to cause content displayed on the digital ink canvas to change to correspond to the content represented by a selected visual representation. That is, each visual representation represents a state of the digital ink canvas at some point during a collaboration. The history palette can be perused, i.e., navigated, by the user. When the user selects a particular history entry (or visual representation), the digital ink canvas, or a portion thereof, can be returned to the state associated with the particular history entry. For example, in at least some embodiments, the history palette can permit panning, e.g., as by swiping or otherwise advancing forward and backward, through the history palette to enable user to select a particular visual representation. Alternately or additionally, the user may simply touch select a particular history entry. Once the particular visual representation is selected, the digital ink canvas is then returned to the state associated with the selected visual representation. The selected visual representation can then be provided across the appliances participating in the virtual collaboration, as described above. This allows users to quickly and efficiently return to a particular state of the collaboration without having to repetitively engage, e.g., click, an undo or a redo button.

The appliances (e.g., the large and reduced format appliances 106, 108) discussed herein are generally coupled together via streaming infrastructure 202 and messaging infrastructure 204. Each of these different infrastructures may include hardware that is cloud-based and/or co-located on-premises with the various appliance, which are both represented by network 110. However, persons skilled in the art will recognize that a wide variety of different approaches may be implemented to stream content streams and transport messages/messages between display systems.

Figure 3:
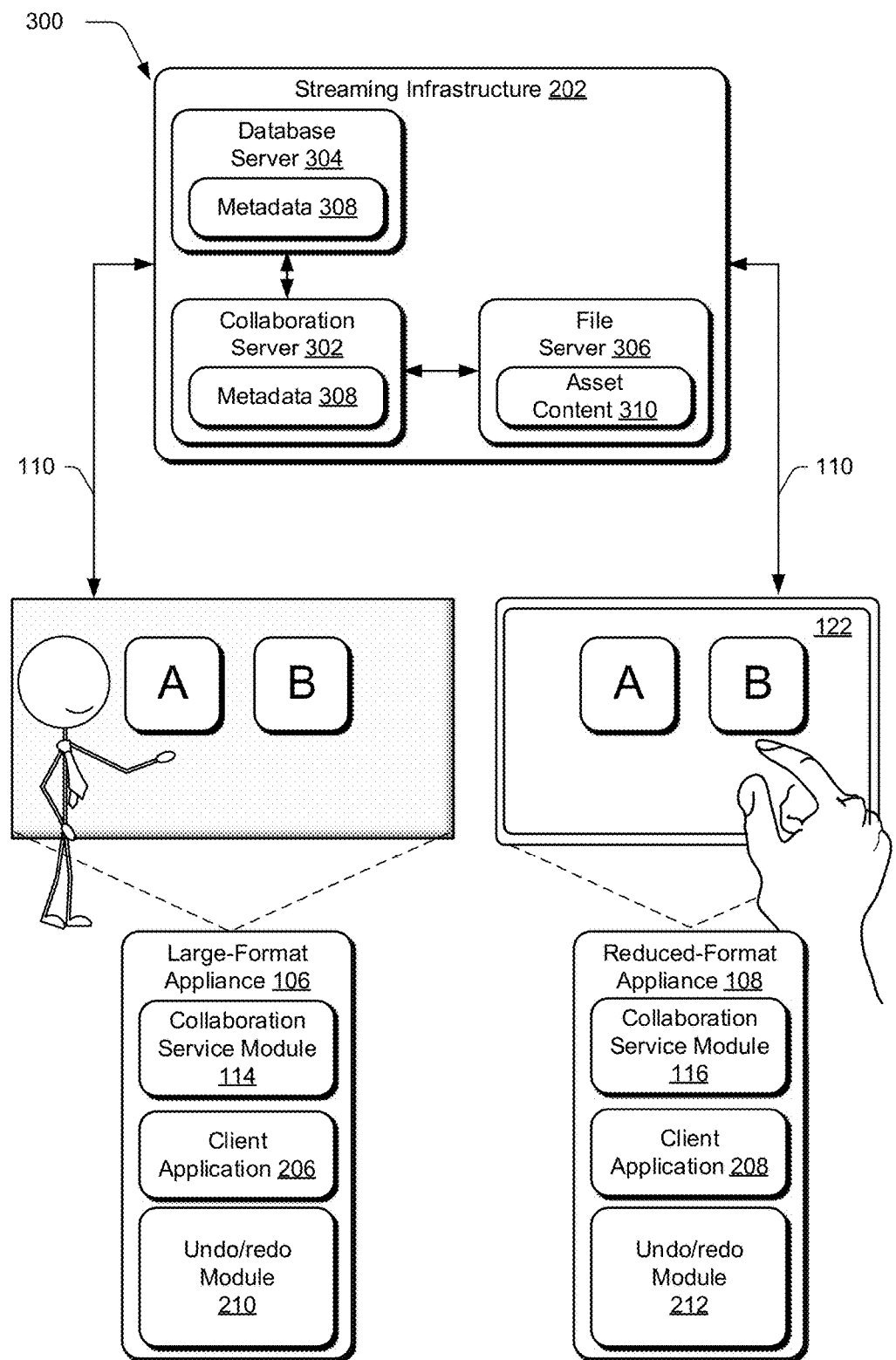
FIG. 3 depicts a streaming infrastructure of FIG. 2 in greater detail.

FIG. 3 depicts a block diagram 300 showing the streaming infrastructure 202 of FIG. 2 in greater detail. Streaming infrastructure 202 in this example includes a collaboration server 302, a database server 304, and a file server 306. Each server may comprise a computer device having a processor (such as processing system unit described in relation to FIG. 11) and a computer-readable medium such as memory, the processor executing software for performing functions and operations described herein. Collaboration server 302, database server 304, and file server 306 may be implemented as shown as separate and distinct computing devices/structures coupled to each other and to the appliances via a network 110. Alternatively, functionality of collaboration server 302, database server 304, and file server 306 may be implemented as a single computing device/structure in a single location (e.g., logically or virtually), or in any other technically feasible combination of structures. Further, one or more of collaboration server 302, database server 304, and/or file server 306 may be implemented as a distributed computing system. The network 110 may be via any technically feasible communications or information network, wired or wireless, that allows data exchange, such as a wide area network (WAN), a local area network (LAN), a wireless (WiFi) network, and/or the Internet, among others.

Collaboration server 302 coordinates the flow of information between the various appliances (e.g., the large and reduced format appliances 106, 108), database server 304, and file server 306. Thus, in some implementations, collaboration server 302 is a streaming server for the appliances. In some embodiments, the application program interface (API) endpoint for the appliances and/or business logic associated with streaming infrastructure 202 resides in collaboration server 302. In addition, collaboration server 302 receives requests from appliances and can send notifications to the appliances. Therefore, there is generally a two-way connection between collaboration server 302 and each of appliances, e.g., the large and reduced format appliances 106, 108. Alternatively or additionally, appliances may make requests on collaboration server 302 through the API. For example, during collaborative work on a particular project via collaboration system 100, an appliance may send a request to collaboration server 302 for information associated with an asset to display the asset in a shared workspace of the particular project.

Database server 304 (as well as collaboration server 302) may store metadata 308 associated with collaboration system 200, such as metadata for specific assets, shared workspaces, and/or projects. For example, such metadata may include which assets are associated with a particular shared workspace, which shared workspaces are associated with a particular project, the state of various settings for each shared workspace, annotations made to specific assets, etc.

Metadata 308 may also include aspect ratio metadata and asset metadata for each asset. In some implementations, aspect ratio metadata may include an aspect ratio assigned to the project (referred to herein as the "assigned aspect ratio"). An aspect ratio assigned to a project applies to the shared workspaces of the project so that all shared workspaces of the project have the same aspect ratio assigned to the project. Asset metadata for an asset may specify a location/position and dimensions/size of the asset within an associated shared workspace.

The asset metadata indicates the position and size of an asset, for example, implementing horizontal and vertical (x and y) coordinate values. In some embodiments, the asset metadata may express the position and size of an asset in percentage values. In such implementations, the size (width and height) and position (x, y) of the asset is represented in terms of percent locations along an x-axis (horizontal axis) and y-axis (vertical axis) of the associated shared workspace. For example, the position and size of an asset may be expressed as percentages of the shared workspace width and shared workspace height. The horizontal and vertical (x and y) coordinate values may correspond to a predetermined point on the asset, such as the position of the upper left corner of the asset. Thus, when display surfaces of appliances have different sizes and/or aspect ratios, each asset can still be positioned and sized proportional to the specific shared workspace in which is it being displayed. When multiple display devices of multiple appliances separately display a shared workspace, each may configure the local version of the shared workspace based on the received metadata.

File server 306 is the physical storage location for some or all asset content 310 that are rendered as files, such as documents, images, and videos. In some embodiments, file server 306 can receive requests for asset content 310 directly from appliances. For example, an asset, such as a word-processing document, may be associated with a shared workspace that is displayed on a display device of a plurality of appliances, e.g., the large and reduced format appliances 106, 108. When the asset is modified by a user at the large-format appliance 106, metadata for a file associated with the asset is updated in file server 306 by collaboration server 302, the reduced-format appliance 108 downloads the updated metadata for the file from file server 306, and the asset is then displayed, as updated, on the gesture-sensitive display surface 124 of the reduced-format appliance 108. Thus, file copies of all assets for a particular shared workspace and project may be stored at the file server 306, as well as stored at each appliance that is collaborating on a project.

Each of the appliances is an instance of a collaborative multi-media platform disposed at a different location in a collaboration system 100. Each collaboration appliance is configured to provide a digital system that can be mirrored at one or more additional and remotely located appliances. Thus, collaboration clients facilitate the collaborative modification of assets, shared workspaces, and/or complete presentations or other projects, as well as the presentation thereof.

Figure 4:
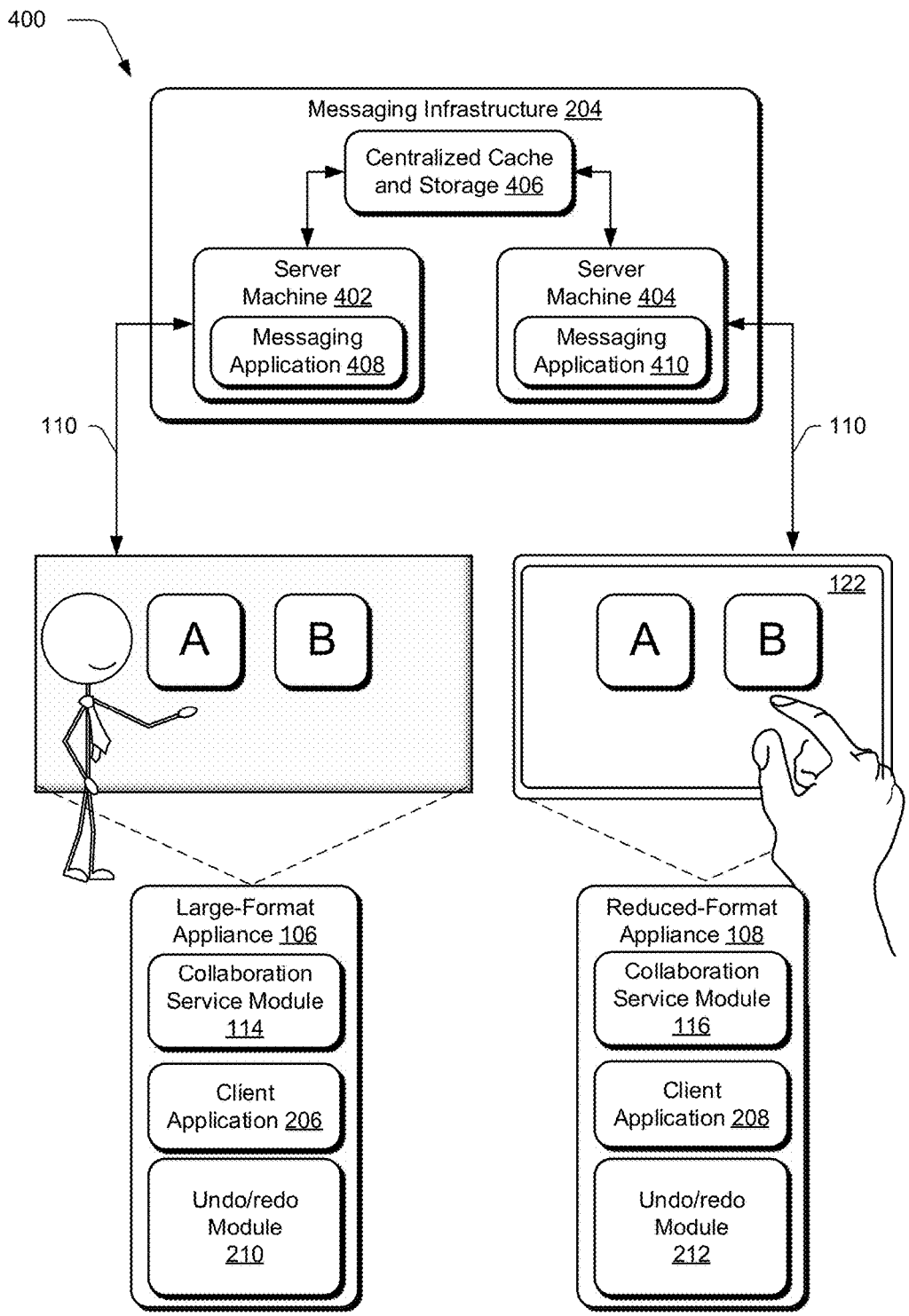
FIG. 4 depicts a messaging infrastructure of FIG. 2 in greater detail.

FIG. 4 depicts the messaging infrastructure 204 of FIG. 2 in greater detail. As shown, messaging infrastructure 204 includes server machines 402 and 404 coupled together via centralized cache and storage 406. Server machine 402 is coupled to the large-format appliance 106 and includes a messaging application 408. Server machine 404 is coupled to the reduced-format appliance 108 and includes a messaging application 410.

Figure 11:
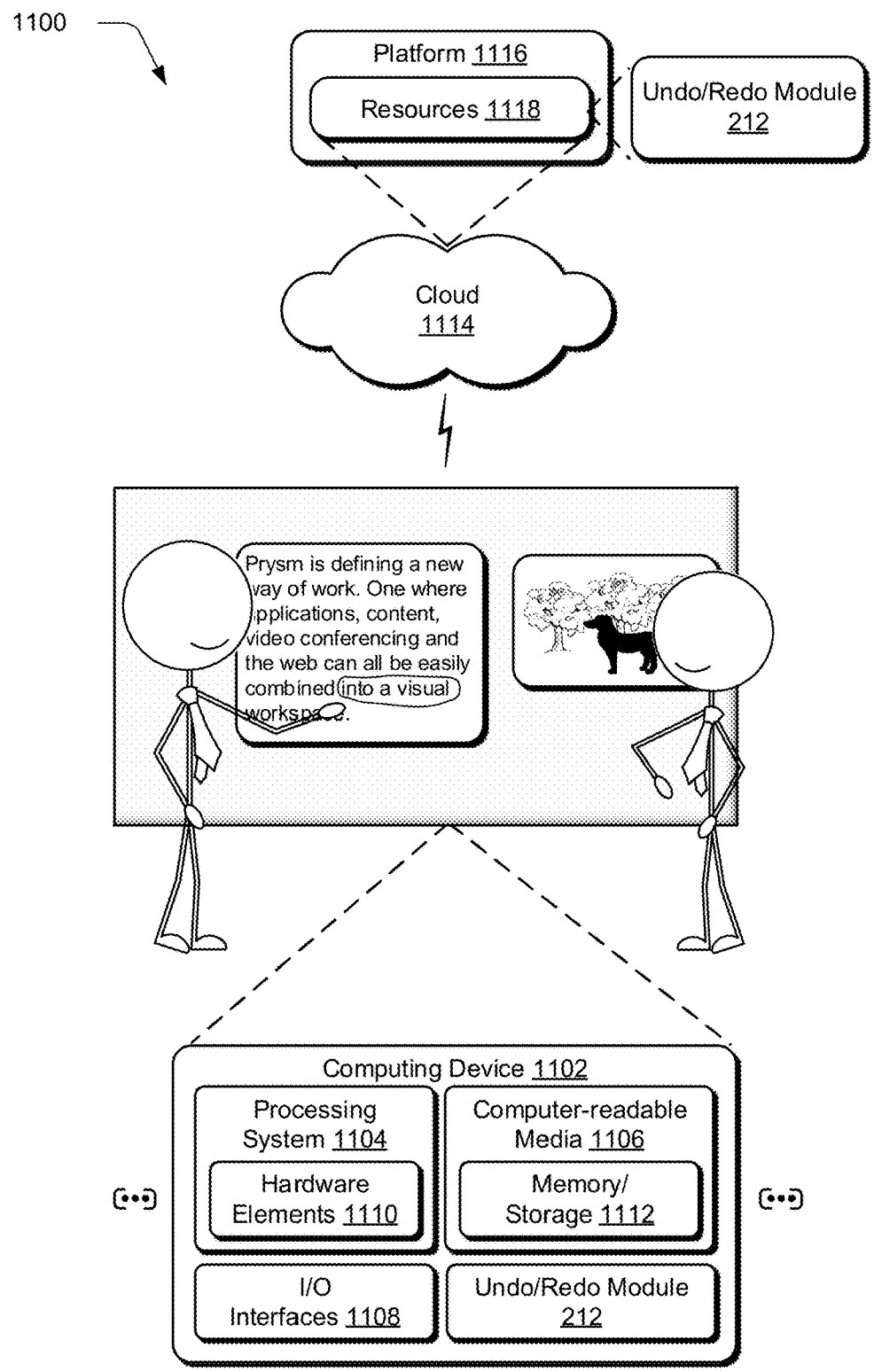
FIG. 11 illustrates an example system including various components of an example device that can be implemented as any type of computing device as described and/or utilize with reference to FIGS. 1-10 to implement embodiments of the techniques described herein.

Server machines 402 and 404 are generally cloud-based or on-premises computing devices that include memory and processing systems as further described in relation to FIG. 11 configured to store and execute messaging applications 408 and 410, respectively. Messaging applications 408 and 410 are configured to generate real-time socket connections with the large and reduced format appliances 106, 108, respectively, to allow messages to be transported quickly between the appliances. In one implementation, messaging applications 408 and 410 are implemented as ASP.NET applications and rely on signalR WebSockets to accomplish fast, real-time messaging.

Centralized cache and storage 406 provides a persistent messaging backend through which messages can be exchanged between messaging applications 408 and 410. In one embodiment, centralized cache and storage includes a Redis cache backed by a SQL database. Messaging applications 408 and 410 may be configured to periodically poll centralized cache and storage 406 for new messages, thereby allowing messages to be delivered to those applications quickly.

In operation, when the large-format appliance 106 transmits a message indicating that content stream A is available on streaming infrastructure 202, as described above, the large-format appliance 106 transmits that message to messaging application 408. Messaging application 408 may then relay the message to centralized cache and storage 406. Messaging application 410 polls centralized cache and storage 406 periodically, and may thus determine that the message has arrived. Messaging application 410 then relays the message to the reduced-format appliance 108. The reduced-format appliance 108 may then parse the message to retrieve an identifier associated with the large-format appliance 106, and then stream content associated with the large-format appliance 106 from streaming infrastructure 202.

Having considered the example systems above, consider now an example undo/redo module in accordance with one or more embodiments.

Example Undo/Redo Module

As noted above, the undo/redo module supports undo and redo operations in connection with a digital ink canvas. The digital ink canvas is a digital area that accepts inputs from a user such as touch, mouse, stylus, and the like, and renders a digital stroke. A digital stroke can be thought of as a collection of points and can have various properties such as colors, thicknesses, and opacity. The described techniques make use of a history palette which includes individual history entries. Each history entry provides a visual representation of a state of the digital ink canvas at some point during the collaboration. In some instances, the visual representation appears as a thumbnail representation. The thumbnail representation constitutes a visual depiction of content that has been provided onto the digital ink canvas. To this extent, the thumbnail representation is akin to a visual "snapshot" of the digital ink canvas that is reduced in size, e.g., scaled, and represented, along with other thumbnail representations, in the history palette. The content provided onto the digital ink canvas can include, by way of example and not limitation, not only digital strokes, but other content such as applications, files, documents, and the like.

When a user interacts with the digital ink canvas, content of the interaction is saved, for example, in a database, and the interaction is applied to the digital ink canvas. The digital ink canvas is then rasterized to provide a rasterized image which serves as a basis for each visual representation that appears in the history palette.

The history palette provides a navigable user interface instrumentality which can be used by the user to cause content displayed on the digital ink canvas to change to correspond to the content represented by a selected visual representation. That is, each visual representation represents a state of the digital ink canvas at some point during a collaboration. The history palette can be perused, i.e., navigated, by the user. When the user selects a particular history entry (or visual representation), the digital ink canvas can be returned to the state associated with the particular history entry. For example, in at least some embodiments, the history palette can permit panning, e.g., as by swiping or otherwise advancing forward and backward, through the history palette to enable user to select a particular visual representation. Alternately or additionally, the user may simply touch select a particular history entry. Once the particular visual representation is selected, the digital ink canvas is then returned to the state associated with the selected visual representation. The selected visual representation can then be provided across the appliances participating in the virtual collaboration. This allows users to quickly and efficiently return to a particular state of the collaboration without having to repetitively engage, e.g., click, an undo or a redo button.

The technical solution provided by the history palette described below addresses the technical problem of enabling a user to quickly return to a previous digital ink canvas state. This is done through the novel history palette that provides a quick visual reference for the user in which the user is able to see multiple different states of the digital ink canvas in chronological order. This enables the user to quickly and efficiently navigate to a particular history entry that may be of interest. In at least some embodiments, the user is relieved of having to repetitively click or otherwise select an undo or a redo button in order to slowly serially advance through digital ink canvas states. That is, by providing simple navigational input, such as through a swiping gesture, a user can quickly advance through the history palette to the history entry of interest. Furthermore, rather than, or in addition to navigating through the history palette, a user may simply click, tap or touch a history entry to have the digital ink canvas updated so that it displays content associated with the selected history entry. Moreover, processing efficiencies are promoted because unlike the scenario in which the undo or redo button is used to serially advance through the digital ink canvas states, which requires each individual history entry to be re-rendered, in many instances, the history palette does not require as many individual history entries to be re-rendered, as will become apparent below.

Figure 5:
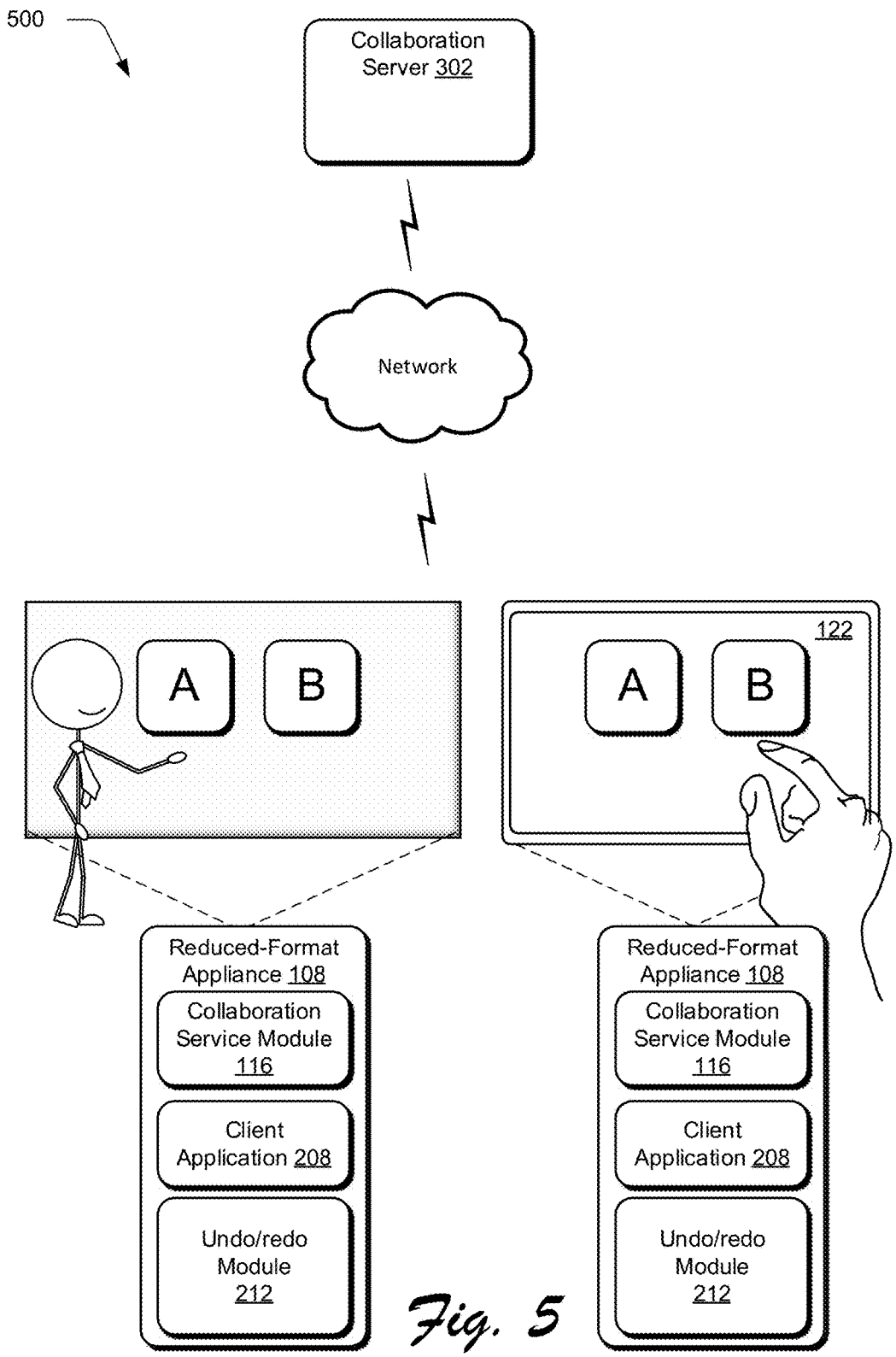
FIG. 5 depicts two appliances taking part in a collaboration by way of a collaboration server.

FIG. 5 illustrates an example environment 500 that includes a collaboration server 302 such as that described above, and multiple different reduced-format appliances 108 that are participating in a collaboration from a common location. In this instance, each of reduced-format appliances 108 shares a common network connection through which each can communicate with collaboration server 302. Although only two appliances are illustrated, more than two appliances can be located at any one particular location.

The common network connection that is shared by the reduced-format appliances 108 allows for content, including the history palette, to be shared amongst the appliances. Each reduced-format appliance's undo/redo module 212 manages a corresponding history palette, in the manner described above and below, so that when a particular user at a reduced format appliance (or a large format appliance) manipulates the history palette to select a particular history entry, that history entry, or selection thereof, is shared out amongst the other appliances so that each appliance's digital ink canvas can be returned to a state corresponding to the selected history entry.

Consider now some implementation examples in accordance with one or more embodiments.

Implementation Example

Figure 6:
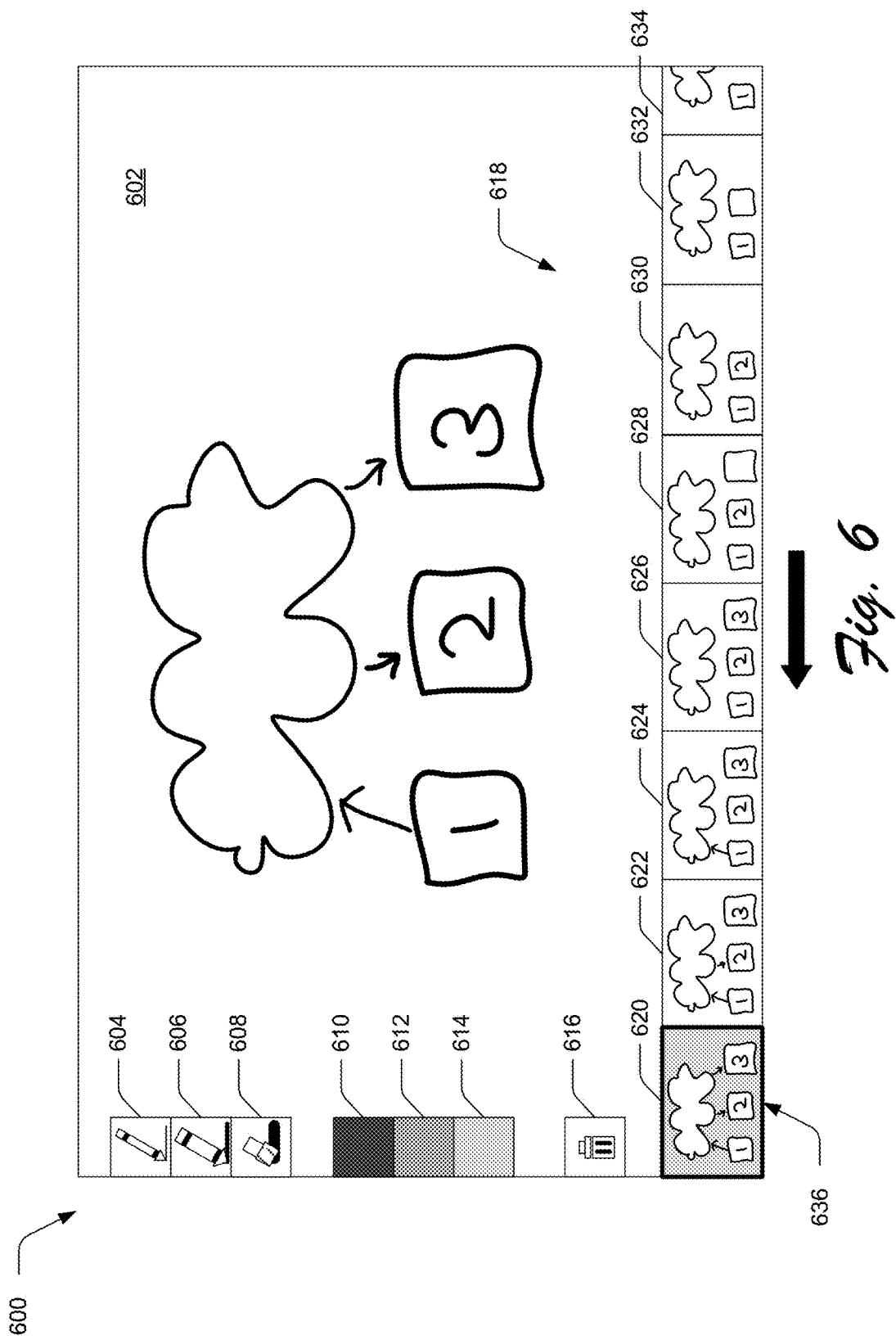
FIG. 6 depicts a digital ink canvas in accordance with one or more embodiments.

FIG. 6 illustrates a system, generally at 600, that includes a digital ink canvas 602. The digital ink canvas is a digital area that accepts inputs from a user such as touch, mouse, stylus, and the like, and renders a digital stroke. A digital stroke can have various properties such as colors, thicknesses, and opacity. In this example, the digital ink canvas 602 includes a number of user instrumentalities that can be used to provide input, in the form of strokes, to the digital ink canvas 602. In this particular example, the user instrumentalities include a pen tool 604, a marker tool 606, and an eraser tool 608.

The pen tool 604 enables the user to write on the digital ink canvas to provide a stroke that has a first thickness; the marker tool 606 enables the user to write on the digital ink canvas to provide a stroke that has a second greater thickness; and, the eraser tool 608 enables the user to erase content on the digital ink canvas.

The digital ink canvas 602 also provides a color palette that can be used to select the color of a particular stroke. In this example, the color palette has three colors 610, 612, and 614. By selecting one of the input tools, such as the pen tool 604, and by selecting a color, such as color 610, a stroke can be made on the digital ink canvas having the selected color. For example, if the user selected the pen tool 604 and the color 610 (e.g., purple) and drew the illustrated cloud, the stroke defining the cloud would be in the color purple.

In the context of this document, a digital stroke may be thought of as a collection of points (which may or may not be converted into a defined line stroke, curve segment stroke, Bezier stroke, etc.) and can have various colors, thicknesses, and opacity. A stroke begins when a user provides a drawing input as by providing a touch engagement of the digital ink canvas with a finger or an input device (i.e. a touch down event), or otherwise providing input to start the drawing process, as by a gesture which need not necessarily physically touch the digital ink canvas. The stroke ends or concludes when the drawing input ends (i.e. a touch up event). Such can occur by lifting a finger or input device from the digital ink canvas, or otherwise terminating the drawing process by ending the gesture. The stroke is defined by a collection of points, each of which has a location. The collection of points and the various attributes of the stroke are saved in a database and constitute the input which is provided to define a history entry as described above and below.

The digital ink canvas 602 also includes a trash can tool 616. When this tool is selected, content in the digital ink canvas can be discarded. So, for example, if a user has created some content by adding a number of strokes to the digital ink canvas, by selecting the trash can tool 616, the strokes can be discarded and the digital ink canvas can be cleared.

In the illustrated and described example, the digital ink canvas 602 includes a history palette, shown generally at 618. The history palette includes a number of history entries 620, 622, 624, 626, 628, 630, 632, and 634. Each history entry provides a visual representation of a state of the digital ink canvas at some point during the collaboration. In one or more embodiments, each visual representation has a date and timestamp which is saved in a database. The date and timestamp enable the history palette to display the history entries in chronological order. In some instances, as represented here, the visual representation appears as a thumbnail representation. When a user interacts with the digital ink canvas, content of the interaction is saved, for example, in a database, and the interaction is applied to the digital ink canvas. The digital ink canvas is then rasterized to provide a rasterized image which serves as a basis for each visual representation that appears in the history palette. When the digital ink canvas is rasterized to provide the rasterized image, the strokes or collection of strokes that appear on the digital ink canvas are processed to maintain their respective dimensions. So, for example, a horizontal stroke that extends entirely across the digital ink canvas would be represented, in the visual representation, as extending entirely across the visual representation. Likewise, a stroke that extends only a short distance across the digital ink canvas would be represented, in the visual representation, as extending only a correspondingly short distance across the visual representation. Accordingly, each visual representation or history entry represents a miniaturized version of the digital ink canvas whose content has been scaled down to fit within each history entry.

In this example, and starting with history entry 632, the user has drawn a cloud, two boxes, and entered the number "1" in a first of the boxes. History entry 630 represents the digital ink canvas at a next state where the user has drawn another stroke in the form of the number "2" which has been entered in the second box. History entry 628 represents the digital ink canvas at a next state where the user has drawn another stroke in the form of a third box. History entry 626 represents the digital ink canvas at a next state where the user has entered another stroke in the form of a number "3" that has been entered into the third box. Progressing through history entries 624, 622, and 620, one can see the additional states of the digital ink canvas as the user has added content in the form of strokes to the canvas.

The history palette 618 thus provides a navigable user interface instrumentality which, in at least some embodiments, permits panning, e.g., as by swiping or otherwise advancing forward and backward, through the history palette 618 to enable user to select a particular visual representation, i.e. history entry. In this particular example, a view window 636 provides a mechanism that can be used to select a particular history entry. That is, in this example, the view window 636 remains stationary and grounded in the lower left-hand corner of the digital ink canvas. The user can provide input to slide the individual history entries into the view window 636 to select a visual representation to be rendered on the digital ink canvas 602. Sliding the history entries within history palette 618 to the left, in the direction of the arrow, represents an undo action in which the digital ink canvas can be provided into a previous state. Similarly, sliding the history entries within history palette 618 to the right, represents a redo action which advances the state of the digital ink canvas 602. Thus, by navigating through the history palette 618, the digital ink canvas can be placed into a state associated with the selected visual representation, i.e. history entry. The selected history entry can then be provided across the appliances participating in the virtual collaboration, as described above. This allows users to quickly and efficiently return to a particular state of the collaboration without having to repetitively engage, e.g., click, an undo or a redo button.

Figure 7:
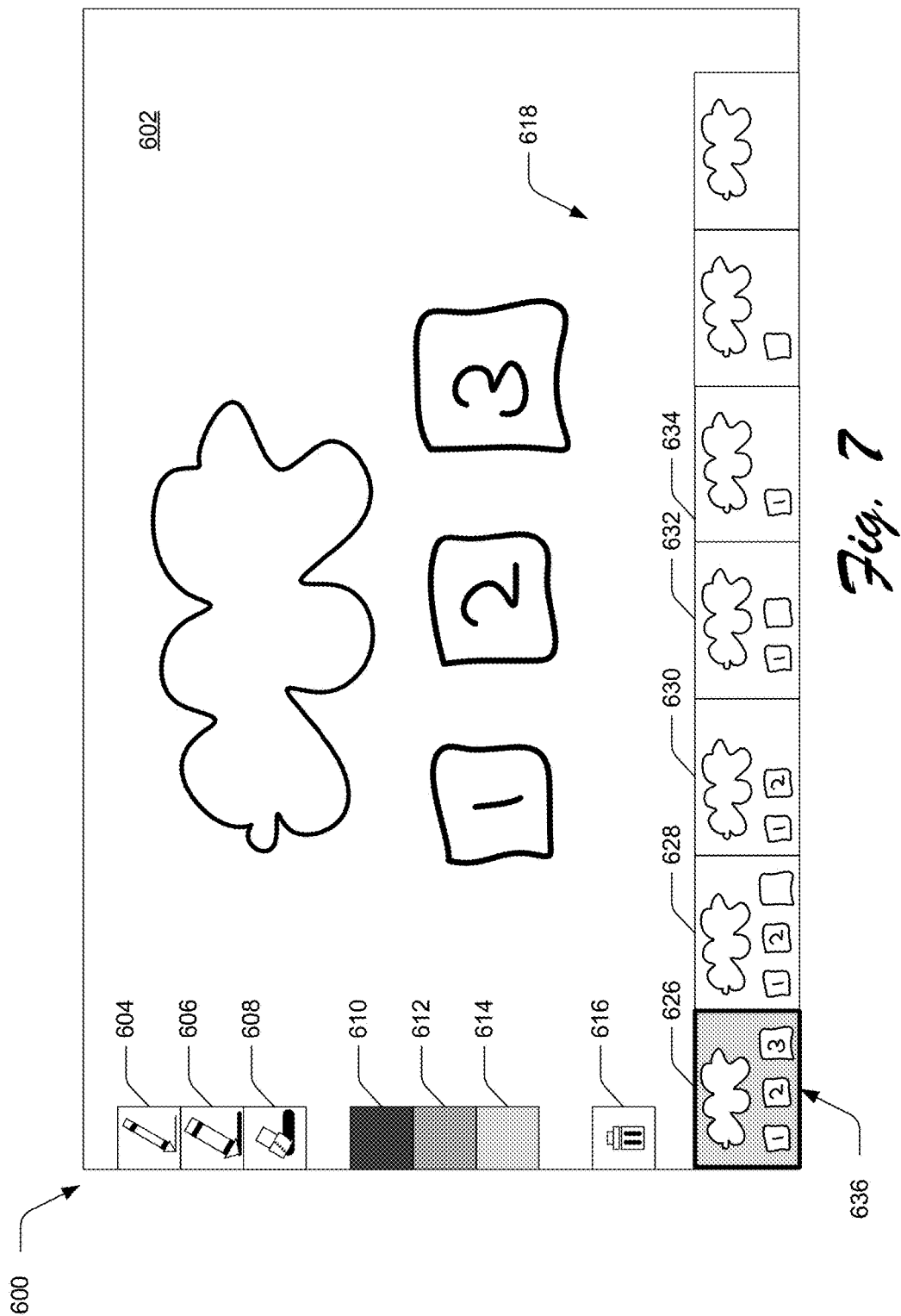
FIG. 7 depicts a digital ink canvas in accordance with one or more embodiments.

So, in this example, the state of the digital ink canvas includes a cloud with three numbered boxes "1", "2", and "3", along with three arrows one of which points toward the cloud, and two of which point away from the cloud. Suppose now that the user wishes to pause the collaboration and return to a discussion of history entry 626. Specifically, the user may wish to further elaborate on the relationship represented by the direction of the arrows that appear in subsequent history entries 624, 622, and 620. Accordingly, history entry 626 represents the state of the digital ink canvas prior to the illustrated arrows having been drawn. To return to this particular state, the user need simply provide input to the history palette to navigate back to history entry 626. In this particular example, the user may provide touch input to swipe the history palette to the left so as to move history entry 626 into view window 636. When this occurs, the visual representation represented by history entry 626 can be rendered on digital ink canvas 602. As an example, consider FIG. 7.

There, the visual representation represented by history entry 626 has been rendered on digital ink canvas 602. As such, the user can proceed with their discussion of this content prior to addition of the arrows in the subsequent history entries mentioned above. When the user is done with their discussion, they can simply swipe the history palette to the right to navigate back to the most recent history palette which, in turn, returns the digital ink canvas to its state prior to navigating to history entry 626.

It is to be appreciated and understood that while navigation of the history palette occurs, in this example, by moving the individual history entries relative to a stationary view window, such need not necessarily be the case. For example, navigation of the history palette may occur by moving the view window 636 relative to history entries which remain stationary. Furthermore, while the history palette is illustrated as horizontal and extending across the bottom of the digital ink canvas, the history palette can be disposed at any suitable location within the digital ink canvas. For example, the history palette 618 could be disposed at the top of the digital ink canvas. Alternately or additionally, the history palette 618 could be vertically disposed along either the left or right side of the digital ink canvas.

In one or more embodiments, the history palette can be used to capture not only strokes that are entered by a user, captured by the client, sent to the server to be persisted and mirrored to the other participants as in the above example, but the history palette can also be used to capture the state of the digital ink canvas including applications that have been opened, content that has been added or rendered, and the like. The history palette is saved both locally, and shared out amongst appliances participating in the collaboration so that each individual application can display a history palette of its own local creation and/or is synchronized with all other history palettes across the one or more devices in the collaboration (or shared among a common workspace and may be stored associated with each workspace). The history palette can be shared as described above in connection with the collaboration server. That is, the strokes that are used to define each history entry of the history palette are captured by the local appliance on which the strokes are provided. Attributes and properties of the strokes can then be sent to the collaboration server and shared out to other participants in the collaboration, as described above. In some embodiments, strokes can be captured in an additive manner across multiple participants in a collaboration. So, for example, one participant may input a stroke, and another participant may add to that stroke by providing another stroke. All such strokes can be captured in an additive manner and become part of the history palette that is share out amongst all participants. In this sense, the digital ink canvas and history palette can be used to capture the overall state of a collaboration session so that the digital ink canvas can be placed into a state associated with any of the history entries. So, for example, if in the beginning of a collaboration, a presenter opens up a spreadsheet application and makes a series of entries, corresponding history entries displayed in the history palette would show the digital ink canvas at various states during presentation of the spreadsheet application, and these history entries would be shared out amongst the collaboration participants. Now, assume the user closes the spreadsheet application and opens a word processing application. Corresponding history entries displayed in the history palette would now show various states during presentation of the word processing application, and would be shared out amongst the collaboration participants. By using the navigational capabilities of the history palette, various users can navigate back to the spreadsheet application presentation and then forward again to the word processing application. As such, the history palette can be used for much more than simply capturing the strokes applied to the digital ink canvas by user.

In the illustrated and described example, as one user within the collaboration manipulates the history palette to change the state of the digital ink canvas 602, the state changes to the digital ink canvas are conveyed to the other appliances participating within the collaboration by way of the collaboration server, as described above. At those other appliances, corresponding history pallets are updated as well as the digital ink canvas. In this manner, any participant in a collaboration can interact with the history palette on any form factor appliance, and cause those interactions to be propagated to all of the other appliances in the collaboration. In this manner, content that is rendered on the digital ink canvas 602 by virtue of interactions with the history palette can be easily synchronized across multiple appliances.

In operation, in one or more embodiments, when a user selects a tool, such as the pen tool 604, the user can configure the pen in different ways such as by selecting a particular color option and/or a different thickness option. When the user does this, the tool configuration information is saved locally in the client application. This occurs even before the user draws a stroke. As the user begins to apply the stroke, the configuration information and attributes are applied to the stroke, such as the thickness, color, and the like. As the stroke is drawn by the user, the user's input is sampled and the stroke is rendered on to the digital ink canvas. When the stroke is complete, as by lifting the pen tool off of the digital ink canvas, information associated with the stroke, such as the configuration information, attributes, point locations, tool used and the like, are saved as a record in the database and shared out amongst participants. In one or more embodiments, the dimensions of the digital ink canvas, i.e., width and height are also saved. Saving the width and height of the canvas can facilitate re-creating the strokes drawn by the user in the event the digital ink canvas is resized, or in the event one or more of the appliances participating in the collaboration have a different form factor than the appliance on which stroke has been drawn. Specifically, if the digital ink canvas is resized, a simple scaling operation can be performed to re-create the strokes provided by the user.

Additionally, when a stroke is completed by the user, as by lifting the pen tool off of the digital ink canvas, a canvas capture operation can take a "snapshot" of the digital ink canvas which can then be saved as a map in memory. The map can then be rasterized to create each history entry. Each history entry is associated with an asset which is part of the workspace. The history entries will continue to be associated with the workspace while the workspace is active. If the content of the workspace is saved, so too will be the history entries in the history palette. This can facilitate recalling the history palette in future sessions. That is, in at least some embodiments, history entries are perpetual and are stored in a database. When loading a workspace with stroke data, the client queries the database for the strokes that it needs to render. In some instances, the client can specify how far back in history to go to retrieve strokes. For example, the client might specify to obtain strokes only for one particular session. Alternately or additionally, since the perpetual history is saved, the client might specify to obtain strokes that correspond to the very first entry. So, in at least some embodiments, individual history entries, such as history entry 626, can correspond to a stroke that has been added by the user. In this particular example, the stroke that was added as between history entry 628 and history entry 626 is the number "3".

If the user selects the erase tool 608 and applies it to content on the digital ink canvas, information associated with the location of the erase operation is used to ascertain whether any points associated with one or more strokes are intersected by the erase operation. If one or more points are intersected by the erase operation, those points are simply removed for purposes of creating a corresponding history entry.

Figure 8:
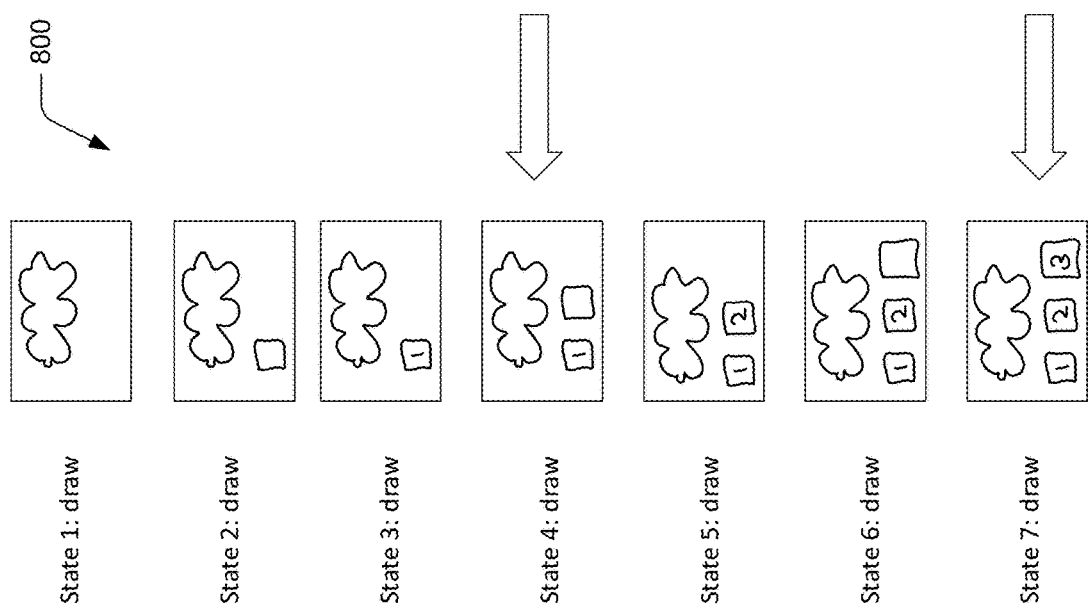
FIG. 8 depicts different states of a history palette in accordance with one or more embodiments.

In some embodiments, when a user executes an undo operation, as by swiping the history entries to the left (FIG. 7), the entire digital ink canvas can be rebuilt starting from the first state. As an example, consider FIG. 8.

There, seven different states of the digital ink canvas are represented by their respective history entries. State 1 represents an initial state where the cloud is drawn with one stroke, state 2 represents the next stroke which added a box, state 3 represents the next stroke which added the number "1", and so on.

Assume now that a user interacts with the history palette to conduct an undo operation to move from state 7 to state 4 as shown. The undo/redo module reconstructs the digital ink canvas by starting with the initial state—state 1—and rebuilding the digital ink canvas by progressing through the states to ascertain which strokes need to be created up to the state selected by the user—here state 4. This includes taking into account any erase operations that may have taken place. So, for example, if the first two states are draw operations, the third state is an erase operation that erases a portion of the content of state 2, and the fourth state is a draw operation, the undo/redo module will know, based on information stored in memory, that the portion of content erased in state 2 does not need to be redrawn, but rather only the content that was added in state 4. Reconstructing the digital ink canvas by starting with the initial state and progressing through to the selected state, rather than simply selecting a corresponding history entry and rendering the selected history entry to the digital ink canvas, is advantageous because it takes into account any intervening resizing events, thus making it much less computationally complex than rendering directly from a selected history entry. This is particularly the case with different form factor-sized appliances.

In one or more embodiments, efficiencies can be gained by considering any instances where a user has discarded content using the trash can tool 616. Specifically, assume that a user wishes to return from the history entry of state 7 to the history entry of state 6. However, assume that at state 4, the user discarded content using the trash can tool 616 and began with new content at state 5. In this instance, the undo/redo module need only start at state 5 to re-create the digital ink canvas. That is, the undo/redo module need not return to the initial state 1 because all content was discarded at state 4.

Having considered the embodiments described above, consider now example procedures in accordance with one or more embodiments.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In the illustrated and described embodiment, the operations are performed in a collaborative environment, such as that described above, in which multiple appliances can share a common network connection to participate in a shared workspace in which data can be streamed to other appliances also participating in the shared workspace.

Figure 9:
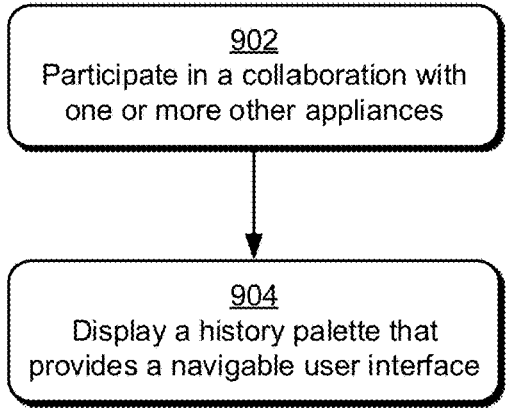
FIG. 9 is a flow diagram depicting a procedure in an example implementation in accordance with one or more embodiments.

FIG. 9 depicts a procedure 900 in an example implementation in which a history palette is displayed on an appliance. At block 902, a first appliance participates in a collaboration with one or more other appliances. Participation can take place via one or more networks that enable the first appliance to share assets with one or more other appliances. As described above, the first appliance includes a digital ink canvas that accepts user input to render a visible digital stroke. At block 904, the digital ink canvas displays a history palette that provides a navigable user interface. The history palette includes, as described above, multiple history entries that provide respective visual representations of different states of the digital ink canvas. In instances where multiple windows are opened, some embodiments can provide a history palette for each window. This would enable strokes to be associated with particular individual windows and have their own window-specific history entry. Alternately, in other embodiments, a single "global" history palette can be provided for the entire digital ink canvas. In instances where multiple windows are open, each stroke entered in a particular window would be captured and represented by a history entry that appears in the global history palette. Selection of a history entry causes a corresponding visual representation to be rendered on the digital ink canvas and for content of the history palette to be shared amongst other appliances participating in the collaboration.

As noted above, in at least some embodiments, the visual representations are thumbnail images of the digital ink canvas at different states. In some instances, each state corresponds to a stroke that has been added by the user. Further, the history palette can be displayed at any suitable location on the digital ink canvas. In the illustrated and described embodiments above, the history palette is displayed horizontally across the bottom of the digital ink canvas. In at least some instances, the history entries are arranged in chronological order, with each history entry being associated with a single digital stroke input by the user. Examples of how this can be done are provided above. In addition, the visual representation shown in the history palette in the form of individual history entries can be constructed in different ways. For example, in some embodiments, the various states of the digital ink canvas can be redrawn at a smaller scale. Alternately, the visual representations can be provided through a rasterization process that rasterizes the digital ink canvas to provide a smaller duplicate version of the digital ink canvas. Alternately, the visual representations can be provided as small, scaled bitmap versions of the digital ink canvas. The visual representations can be constructed either on the client or at the server.

Figure 10:
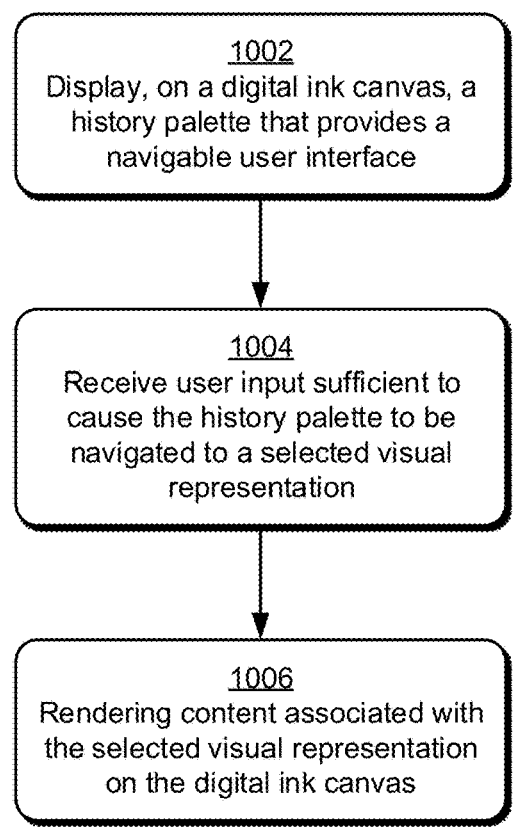
FIG. 10 is a flow diagram depicting a procedure in an example implementation in accordance with one or more embodiments.

FIG. 10 depicts a procedure 1000 in an example implementation in which a history palette is displayed on an appliance and interacted with by a user. At block 1002 a history palette is displayed on a digital ink canvas on a first appliance. The first appliance is taking part in a collaboration with one or more other appliances in which assets can be shared amongst the appliances. As described above, the history palette provides a navigable user interface and includes multiple history entries that provide respective visualizations of different states of the digital ink canvas. As in the above example, selection of a history entry causes a corresponding visual representation to be rendered on the digital ink canvas. The digital ink canvas is configured to display various types of content including accepting user input to render a visible digital stroke which can then be shared with the other appliances participating in a collaboration. At block 1004, user input is received sufficient to cause the history palette to be navigated to a selected visual representation. Any suitable user input can be received, in at least some embodiments, user input is received to pan the history palette. Responsive to navigating to the selected visual representation of a history entry, content associated with the selected visual representation is rendered, at block 1006, on the digital ink canvas. The content can be rendered in any suitable way. In at least some embodiments, the content is rendered in a stationary view window, such as that described above. In at least some embodiments, rendering is performed by starting with a state of the digital ink canvas that is previous to a state associated with the selected visual representation. The digital ink canvas is then rebuilt by progressing through successive states of the digital ink canvas to ascertain which strokes need to be created for the selected visual representation. Examples of how this can be done are provided above, including how the state progression takes into account any erase operations that may have taken place and/or any content that has been discarded by a trash can tool.

Having considered various procedures in accordance with one or more embodiments, consider now an example system and device that can be utilized to implement the described embodiments.

Example System and Device

FIG. 11 illustrates an example system generally at 1100 that includes an example computing device 1102 that is representative of one or more computing systems and/or devices that may implement the various techniques described herein. This is illustrated through inclusion of the undo/redo module 212. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
participating, by a first appliance, in a collaboration with one or more other appliances, said participating taking place via one or more networks that enable said appliance and said one or more other appliances to share assets,
said first appliance comprising a digital ink canvas that accepts user input to render a visible digital stroke, the digital ink canvas configured to interact with a plurality of applications simultaneously; and
displaying, on the digital ink canvas, a history palette that provides a navigable user interface, the history palette comprising a plurality of history entries that provide respective visual representations of different states of the digital ink canvas in chronological order, at least some visual representations including respective individual digital strokes that have been rendered on the digital ink canvas using at least one of the plurality of applications,
wherein the history palette is configured to simultaneously display one or more first history entries of the plurality of history entries that show different states of the digital ink canvas across a first type of application of the plurality of applications, and one or more second history entries of the plurality of history entries that show different states of the digital ink canvas across a second type of application of the plurality of applications,
the second type of application different from the first type of application,
the one or more first history entries and the one or more second history entries displayed in the navigable user interface;
wherein selection of a history entry from the navigable user interface causes a corresponding visual representation, including at least one of the first type of application or the second type of application, to be rendered on the digital ink canvas, and for the selected history entry selection to be shared with said one or more other appliances sufficient to cause content associated with said selected history entry to be rendered on corresponding respective digital ink canvasses on said one or more other appliances and
wherein content of the history palette is shared with said one or more other appliances in the collaboration.

2. The method as described in claim 1, wherein the visual representations comprise thumbnail images of the digital ink canvas.

3. The method as described in claim 1, wherein said displaying is performed by displaying the history palette horizontally across a bottom of the digital ink canvas.

4. The method as described in claim 1, wherein the history palette is navigable by panning through the history entries.

5. The method as described in claim 1, wherein each individual history entry is associated with a digital stroke that has been provided by a user.

6. The method as described in claim 1, wherein the history palette is navigable by panning the history entries relative to a stationary view window that enables selection of a history entry.

7. A system implemented in a collaborative environment in which multiple appliances can share a common network connection to participate in a collaboration in which assets can be shared amongst the multiple appliances, the system comprising:
a first appliance;
one or more processors associated with the first appliance;
one or more computer-readable media storing computer-executable instructions which, when executed by the one or more processors implement an undo/redo module configured to perform operations comprising:
displaying, on a digital ink canvas on the first appliance that is taking part in a collaboration with one or more other appliances in which assets can be shared amongst the appliances, the digital ink canvas configured to interact with a plurality of applications simultaneously, a history palette that provides a navigable user interface, the history palette comprising a plurality of history entries that provide respective visual representations of different states of the digital ink canvas, wherein selection of a history entry causes a corresponding visual representation to be rendered on the digital ink canvas, wherein the digital ink canvas accepts user input to render a visible digital stroke, and wherein content of the history palette, including selection of a visual representation of a history entry, is configured to be shared with said one or more other appliances in the collaboration, wherein the history palette is configured to simultaneously display one or more first history entries of the plurality of history entries that show different states of the digital ink canvas across a first type of application of the plurality of applications and one or more second history entries of the plurality of history entries that show different states of the digital ink canvas across a second type of application of the plurality of applications, the second type of application different from the first type of application, the one or more first history entries and the one or more second history entries displayed in the navigable user interface;

receiving, with the first appliance, user input sufficient to cause the history palette to be navigated to a selected visual representation; and responsive to navigating to the selected visual representation of a history entry from the navigable user interface, rendering content associated with the selected visual representation, including at least one of the first type of application or the second type of application, on the digital ink canvas and causing content associated with the selected visual representation of the history entry to be shared with said one or more other appliances.

8. The system as described in claim 7 further comprising causing content associated with the selected visual representation to be rendered on said one or more other appliances.

9. The system as described in claim 7, wherein said receiving comprises receiving user input to pan the history palette.

10. The system as described in claim 7, wherein said rendering content comprises rendering content using a stationary view window of the history palette.

11. The system as described in claim 7, wherein the visual representations comprise thumbnail images of the digital ink canvas.

12. The system as described in claim 7, wherein each individual history entry is associated with a digital stroke that has been provided by a user.

13. The system as described in claim 7, wherein said rendering is performed by starting with a state of the digital ink canvas that is previous to a state associated with the selected visual representation, and rebuilding the digital ink canvas by progressing through successive states of the digital ink canvas to ascertain which strokes need to be created for the selected visual representation.

14. The system as described in claim 13, wherein said progressing through successive states comprises taking into account any erase operations that may have taken place.

15. The system as described in claim 13, wherein said progressing through successive states comprises taking into account any content that has been discarded by a trash can tool.

16. One or more non-transitory computer-readable media storing computer-executable instructions which, when executed by the one or more processors, perform operations comprising:

participating, by a first appliance, in a collaboration with one or more other appliances, said participating taking place via one or more networks that enable said appliance and said one or more other appliances to share assets, said first appliance comprising a digital ink canvas that accepts user input to render a visible digital stroke, the digital ink canvas configured to interact with a plurality of applications simultaneously; and displaying, on the digital ink canvas, a history palette that provides a navigable user interface, the history palette comprising a plurality of history entries that provide respective visual representations of different states of the digital ink canvas in chronological order, at least some visual representations including respective individual digital strokes that have been rendered on the digital ink canvas using at least one of the plurality of applications, wherein the history palette is configured to simultaneously display one or more first history entries of the plurality of history entries that show different states of the digital ink canvas across a first type of application of the plurality of applications and one or more second history entries of the plurality of history entries that show different states of the digital ink canvas across a second type of application of the plurality of applications, the second type of application different from the first type of application, the one or more first history entries and the one or more second history entries displayed in the navigable user interface;

wherein selection of a history entry from the navigable user interface causes a corresponding visual representation, including at least one of the first type of application or the second type of application, to be rendered on the digital ink canvas, and for the selected history entry selection to be shared with said one or more other appliances sufficient to cause content associated with said selected history entry to be rendered on corresponding respective digital ink canvasses on said one or more other appliances and wherein content of the history palette is shared with said one or more other appliances in the collaboration.

17. The one or more non-transitory computer-readable media as described in claim 16, wherein the visual representations comprise thumbnail images of the digital ink canvas.

18. The one or more non-transitory computer-readable media as described in claim 16, wherein said displaying is performed by displaying the history palette horizontally across a bottom of the digital ink canvas.

19. The one or more non-transitory computer-readable media as described in claim 16, wherein the history palette is navigable by panning through the history entries.

20. The one or more non-transitory computer-readable media as described in claim 16, wherein each individual history entry is associated with a digital stroke that has been provided by a user.

* * * * *